United States Patent
Chen

(10) Patent No.: US 10,824,848 B2
(45) Date of Patent: Nov. 3, 2020

(54) BIOLOGICAL FEATURE RECOGNITION METHOD AND APPARATUS, AND STORAGE MEDIUM

(71) Applicant: Tencent Technology (Shenzhen) Company Limited, Shenzhen (CN)

(72) Inventor: Jie Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 135 days.

(21) Appl. No.: 16/201,701

(22) Filed: Nov. 27, 2018

(65) Prior Publication Data
US 2019/0147223 A1    May 16, 2019

Related U.S. Application Data

(63) Continuation of application No. PCT/CN2017/093588, filed on Jul. 20, 2017.

(30) Foreign Application Priority Data

Jul. 20, 2016   (CN) .......................... 2016 1 0574489

(51) Int. Cl.
*G06K 9/00* (2006.01)
*G06F 3/01* (2006.01)
(Continued)

(52) U.S. Cl.
CPC ......... *G06K 9/00234* (2013.01); *G06F 3/015* (2013.01); *G06F 21/31* (2013.01);
(Continued)

(58) Field of Classification Search
CPC .................. G06K 9/00234; G06T 7/90; G06T 2207/30201; G06F 3/015; G06F 21/31; G06F 21/32
See application file for complete search history.

(56) References Cited

U.S. PATENT DOCUMENTS

| 8,984,622 B1 | 3/2015 | Baldwin et al. |
| 2015/0186711 A1* | 7/2015 | Baldwin .................. G06F 21/32 382/118 |

(Continued)

FOREIGN PATENT DOCUMENTS

| CN | 101635743 A | 1/2010 |
| CN | 103177494 A | 6/2013 |

(Continued)

OTHER PUBLICATIONS

Tencent Technology, ISRWO, PCT/CN2017/093588, Oct. 18, 2017, 7 pgs.

(Continued)

*Primary Examiner* — Santiago Garcia
(74) *Attorney, Agent, or Firm* — Morgan, Lewis & Bockius LLP

(57) ABSTRACT

The present disclosure discloses a biological feature recognition method performed at a biological feature recognition apparatus. After obtaining a facial image of a user and current heart rate data of the user, the apparatus determines, according to the facial image, current facial color data of the user and a correspondence between facial color data and heart rate data of the user and then determines, according to the correspondence between the facial color data and the heart rate data of the user, whether the current facial color data matches the current heart rate data. If the current facial color data matches the current heart rate data, the apparatus determines that recognition succeeds, thereby effectively avoiding a loophole of biological recognition in application.

12 Claims, 4 Drawing Sheets

(51) Int. Cl.
*G06T 7/90* (2017.01)
*G06F 21/31* (2013.01)
*G06F 21/32* (2013.01)

(52) U.S. Cl.
CPC ................ *G06F 21/32* (2013.01); *G06T 7/90* (2017.01); *G06T 2207/30201* (2013.01)

(56) References Cited

U.S. PATENT DOCUMENTS

| | | | |
|---|---|---|---|
| 2016/0110868 A1* | 4/2016 | Cheng | G06K 9/00234 |
| | | | 382/128 |
| 2016/0259492 A1* | 9/2016 | Le | G06F 16/24568 |
| 2017/0120929 A1* | 5/2017 | Siddiqui | G06F 21/32 |
| 2017/0245786 A1* | 8/2017 | Yen | A61B 5/02416 |
| 2017/0287325 A1* | 10/2017 | Filatova | G08C 23/04 |
| 2018/0028896 A1* | 2/2018 | Ray | A63B 71/0622 |
| 2018/0184959 A1* | 7/2018 | Takahashi | A61B 5/0022 |
| 2018/0203986 A1* | 7/2018 | Huang | H04L 9/3231 |

FOREIGN PATENT DOCUMENTS

| | | |
|---|---|---|
| CN | 103226857 A | 7/2013 |
| CN | 104102868 A | 10/2014 |
| CN | 205179369 U | 4/2015 |
| CN | 104699931 A | 6/2015 |
| CN | 104809371 A | 7/2015 |
| CN | 105188522 A | 12/2015 |

OTHER PUBLICATIONS

Tencent Technology, IPRP, PCT/CN2017/093588, Jan. 22, 2019, 6 pgs.

* cited by examiner

BIOLOGICAL FEATURE RECOGNITION METHOD AND APPARATUS, AND STORAGE MEDIUM

PRIORITY CLAIM AND RELATED APPLICATION

This application is a continuation application of PCT/CN2017/093588, entitled "BIOLOGICAL CHARACTERISTIC RECOGNITION METHOD AND DEVICE, AND STORAGE MEDIUM" filed on Jul. 20, 2017, which claims priority to Chinese Patent Application No. 201610574489.2, filed with the State Intellectual Property Office of the People's Republic of China on Jul. 20, 2016, and entitled "BIOLOGICAL FEATURE RECOGNITION METHOD AND APPARATUS", all of which are incorporated herein by reference in their entirety.

FIELD OF THE TECHNOLOGY

The present disclosure relates to the field of computer technologies, and specifically, to a biological feature recognition method and apparatus, and a storage medium.

BACKGROUND OF THE DISCLOSURE

With rapid development of biological recognition technologies, currently, devices for biological recognition, such as fingerprint recognition and facial recognition, also appear correspondingly, and are widely applied to access control and attendance checking.

In an example in which an attendance checking device uses facial recognition, a full-frontal face image of a person whose attendance is checked is recorded in advance, and during attendance checking, the person whose attendance is checked only needs to face toward the attendance checking device, and after recognizing that a currently collected facial image matches the pre-stored facial image of the person whose attendance is checked, the attendance checking device prompts that attendance is successfully checked.

Compared with an original card-reading attendance checking manner, a facial-recognition attendance checking manner obviously reduces a probability that someone else uses a card of a person get attendance of the person checked. However, some one uses a photograph of another person to get attendance of the person checked. When similarity between a feature read by the attendance checking device from the photograph and a pre-stored feature is higher than a preset threshold, the attendance is also successfully checked. In view of the above, there is a large room for improvement to application of biological feature recognition.

SUMMARY

To resolve the problem that biological recognition in application still has a loophole in the existing technology, embodiments of the present disclosure provide a biological feature recognition method, in which recognition succeeds only when current facial color data of a user matches current heart rate data of the user, thereby effectively avoiding the loophole of biological recognition in application. The embodiments of the present disclosure further provide a corresponding apparatus.

A first aspect of the embodiments of the present disclosure provides a biological feature recognition method performed at a biological feature recognition apparatus having one or more processors and memory storing a plurality of programs to be executed by the one or more processors, the method comprising:

obtaining, by the biological feature recognition apparatus, a facial image of a user on which feature recognition is being performed and current heart rate data of the user;

determining, by the biological feature recognition apparatus according to the facial image, current facial color data of the user and a correspondence between facial color data and heart rate data of the user;

determining, by the biological feature recognition apparatus according to the correspondence between the facial color data and the heart rate data of the user, whether the obtained current facial color data matches the current heart rate data;

in accordance with a determination that the current facial color data matches the current heart rate data, determining, by the biological feature recognition apparatus, that user recognition succeeds; and in accordance with a determination that the current facial color data does not match the current heart rate data, determining, by the biological feature recognition apparatus, that user recognition fails.

A second aspect of the embodiments of the present disclosure provides a biological feature recognition apparatus comprising one or more processors, memory, and a plurality of programs stored in the memory that, when executed by the one or more processors, cause the biological feature recognition apparatus to perform the aforementioned biological feature recognition method.

A third aspect of the embodiments of the present disclosure provides a non-transitory storage medium, storing computer readable instructions. When the instructions are executed, a computer is caused to execute the foregoing biological feature recognition method.

Compared with the existing technology having a problem that a photograph of another person is used for recognition or a photograph is maliciously used for recognition, embodiments of the present disclosure provide a biological feature recognition method, in which recognition succeeds only when current facial color data of a user matches current heart rate data of the user, thereby effectively avoiding a loophole of biological recognition in application and improving recognition accuracy of a biological feature recognition apparatus.

BRIEF DESCRIPTION OF THE DRAWINGS

To more explicitly explain technical solutions in embodiments of the present disclosure, accompanying drawings needed in describing the embodiments are briefly introduced in the following. Apparently, the following accompanying drawings are only some embodiments of the present disclosure, and a person skilled in the art can derive other accompanying drawings from the accompanying drawings without creative work.

DESCRIPTION OF EMBODIMENTS

Embodiments of the present disclosure provide a biological feature recognition method, in which recognition succeeds only when current facial color data of a user matches current heart rate data of the user, thereby effectively avoiding a loophole of biological recognition in application and improving recognition accuracy of a biological feature recognition apparatus. The embodiments of the present disclosure further provide a corresponding apparatus. Details descriptions are separately provided below.

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by a person of ordinary skill in the art based on the embodiments of the present disclosure without any creative work fall within the protection scope of the present disclosure.

Currently, a relatively large bottleneck in facial recognition is how determine that a natural person, instead of a photograph, is recognized. With regard to the problem, the embodiments of the present disclosure provide a biological feature recognition method, in which according to a principle that while a heart rate of a human body changes, a facial color also changes correspondingly, correspondences between facial color data and heart rate of users of fixed groups are constructed, and a correspondence between facial color data and heart rate data of each user includes corresponding facial color data of the user at different heart rates. Then, the correspondence is stored into a biological feature recognition apparatus, and the biological feature recognition apparatus may be a device such as an attendance checking device.

To better understand use of a correspondence between facial color data and heart rate data of a user, a process of establishing a correspondence between facial color data and heart rate data of a user in this embodiment of the present disclosure is first introduced below with reference to FIG. 1.

Heart rate changes and corresponding facial color changes of a user can be collected in a scenario in which the user runs on a running machine.

An attendance checking device is used as an example of the biological feature recognition apparatus. If the attendance checking device is responsible for checking attendance of 30 persons in a company, the attendance checking device needs to first record correspondences between facial color data and heart rate data of the 30 persons, so that for each person, a correspondence between facial color data and heart rate data of the person needs to be established first.

Figure 1:
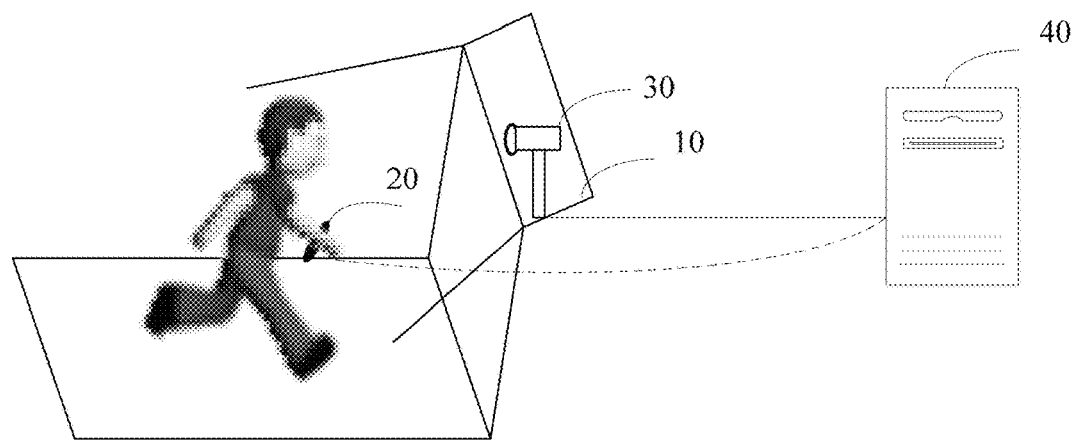
FIG. 1 is a schematic diagram of collecting facial color data and heart rate data of a user and constructing a correspondence between the facial color data and the heart rate data of the user in a scenario in which the user runs on a running machine in an embodiment of the present disclosure.

As shown in FIG. 1, in an example, in which a user on a running machine 10 is one of the 30 persons, the user wears a heart rate collector 20 on a wrist, a camera 30 is mounted on the running machine 10, the camera 30 is configured to collect a facial image of the user during a running process of the user, and the heart rate collector 20 is configured to collect heart rate data of the user during the running process of the user. The heart rate collector 20 may be a smart band, and can measure a heart rate by measuring pulses.

After the camera 30 collects a facial image of the user, and the heart rate collector 20 collects heart rate data, the facial image and the heart rate data of the user can be transmitted to a data collection device 40, the data collection device 40 may be a separate device or the biological feature recognition apparatus in this embodiment of the present disclosure. The camera 30 can be communicably connected to the data collection device 40 in a wired manner, and the heart rate collector 20 can be communicably connected to the data collection device 40 in a wireless manner.

The data collection device 40 obtains a large number of facial images and a large number of pieces of heart rate data, and can match them by time. The data collection device 40 needs to first determine facial color data from the facial images, and in this embodiment of the present disclosure, the facial color data may be quantified by a color temperature or three primary colors. The three primary colors are: red (R), green (G), and blue (B). Certainly, not only a color temperature or three primary colors can be used for quantification, but also, for example, another physical parameter, such as brightness, can be used for quantification.

A color temperature is a scale indicating a light color of a light source, and its unit is Kelvin (K). A color temperature of a light source is determined by comparing a color of the light source with a theoretical hot blackbody radiator. A Kelvin temperature of the hot blackbody radiator at a time point when the hot blackbody radiator matches the color of the light source is the color temperature of the light source, and the color temperature is directly related to the Planck's blackbody radiation law.

For example, color temperatures of some common light sources are that: a color temperature of standard candlelight is 1930 K, a color temperature of a tungsten filament lamp ranges from 2760 to 2900 K, a color temperature of a fluorescent lamp is 3000 K, a color temperature of a flash is 3800 K, a color temperature of midday sunlight is 5600 K, a color temperature of an electronic flash is 6000 K, and so on. A color temperature of a human facial color may range from a dozen K to dozens K.

The RGB is a color standard, in which various colors are obtained by changing channels of three colors, namely, red (R), green (G), and blue (B), and mutually superimposing them. Therefore, RGB is also referred to as three primary colors, and is represented as red (R), green (G), and blue (B) in English.

In a computer, the so-called "amount" of the RGB is brightness, and is represented by an integer. Usually, each color of the RGB has 256 levels of brightness, represented by a numeral from 0, 1, 2, . . . to 255. Therefore, for each facial image, values of corresponding R, G, and B of the facial image can be determined.

A solution of determining facial color data from a facial image may include a method for processing RGB and a method for processing a color temperature.

Because at different heart rates, a facial color mainly changes from pale to red or from pale to red, the method for processing RGB is extracting red (R) values of all pixels on a facial image, then, obtaining an average, and using the average of the R value as facial color data of the current facial image.

The method for processing a color temperature is first determining averages of R, G, and B of all pixels on a facial image and then substituting, according to a color temperature estimation algorithm, the averages of R, G, and B of the facial image into the color temperature estimation algorithm, to obtain a color temperature of the current facial image.

A unit of a heart rate is beats/minute. Therefore, after obtaining facial images in three consecutive minutes and heart rate data in the three minutes, data collection device 40 can construct a correspondence. In examples of the present disclosure, an example in which each person is tested for three minutes is used for description. Therefore, data in the three minutes is used as data herein, and the three minutes should be understood as a limitation to a test time period.

For ease of description, in this embodiment of the present disclosure, only heart rate data and facial images at intervals of 20 seconds are analyzed. In this embodiment of the present disclosure, according to continuity of motion, a facial image of a user is analyzed once at intervals of 20 seconds, and facial color data, such as R, G, and B values or a color temperature value of the user is obtained from the facial image. A color temperature is used as an example for description below.

TABLE 1

Correspondence between heart rate data and facial color data

| Facial image (at intervals of 20 seconds) | Heart rate data (beats/minute) | Color temperature value (K) |
|---|---|---|
| First facial image | 72 | 13 |
| Second facial image | 78 | 16 |
| Third facial image | 85 | 20 |
| Fourth facial image | 92 | 25 |
| Fifth facial image | 99 | 29 |
| Sixth facial image | 105 | 36 |
| Seventh facial image | 110 | 42 |
| Eighth facial image | 115 | 49 |
| Ninth facial image | 121 | 56 |

The foregoing Table 1 is described by using trending data as an example, and data in a correspondence of each user is subject to actual measured values. Moreover, for ease of description, Table 1 merely lists data at intervals of 20 seconds. Actually, the pieces of data may be consecutive. A relationship between a heart rate and a facial color of a natural person is established by using a relational pair of heart rate data and facial color data (such as a color temperature after quantification). Such a data relationship may be a higher-order curve: $y=ax^n+bx^{n-1}+ \ldots +t$, where x may be a heart rate, y may be a facial color, or x is a facial color, and y is a heart rate, a, b, and t are constants, and n is an integer greater than or equal to 2.

Each user has one correspondence between facial color data and heart rate data. The correspondence may be indexed by facial images of the user. A process of the indexing is similar to a process of card reading in existing attendance checking. A facial feature of each user is basically unique. Therefore, when the user uses an attendance checking device provided by this application, the attendance checking device collects a facial image of the user, then, performs, according to the facial image of the user, feature comparison with pre-stored facial images of users, and when the facial image of the user matches a pre-stored user facial image, can extract a correspondence between facial color data and heart rate data of the user. Alternatively, after a serial number of the user is determined according to the facial image of the user, a correspondence between facial color data and heart rate data of the user is indexed by using the serial number of the user. This process includes: setting a serial number for the user when recording the user, determining a serial number of a user having attendance checked through the foregoing feature comparison, and then, indexing the correspondence between facial color data and heart rate data of the user according to the serial number.

Figure 2:
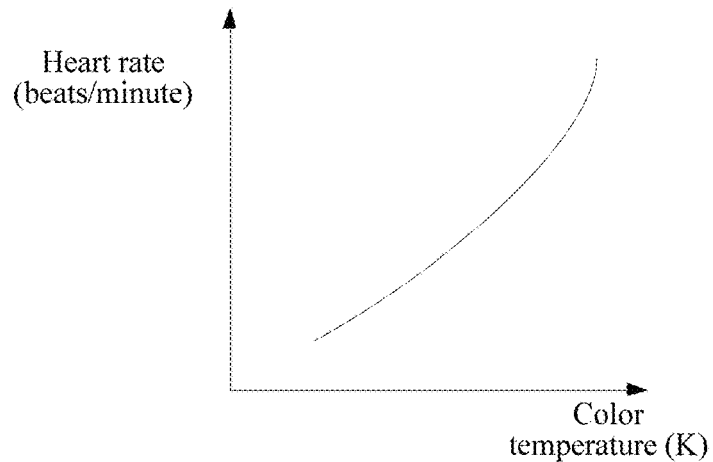
FIG. 2 is a schematic diagram of a curve of a correspondence between facial color data and heart rate data of a user in an embodiment of the present disclosure.

If FIG. 2 is used to represent a correspondence between a heart rate and a facial color, one corresponding facial color value can be found by using one heart rate value on a curve shown in FIG. 2.

After the foregoing correspondence is established, the correspondence between the facial color data and the heart rate data of the user is stored into the biological feature recognition apparatus in this embodiment of the present disclosure.

Figure 3:
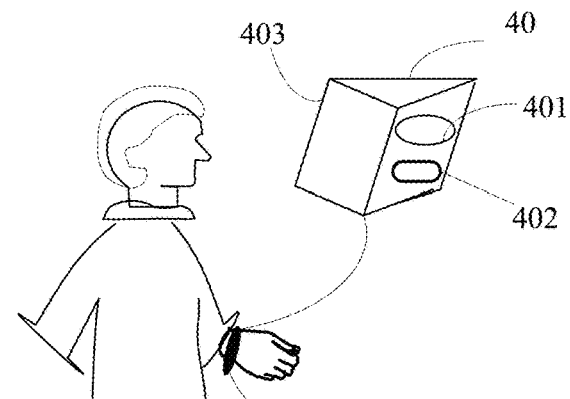
FIG. 3 is a schematic diagram of performing recognition on a user by a biological feature recognition apparatus in an embodiment of the present disclosure.

As shown in FIG. 3, a biological feature recognition apparatus 40 provided in this embodiment of the present disclosure includes a processor 401, a memory 402, a camera 403, and a heart rate collector 404. When a user is using the biological feature recognition apparatus 40, the user faces toward the camera 403, the camera 403 collects a current facial image of the user on which feature recognition is being performed. The user wears the heart rate collector 404 on a wrist, and a heart rate is collected by using pulses. The heart rate collector 404 is configured to collect current heart rate data of the user. The memory 402 stores a correspondence between facial color data and heart rate data of the user. The correspondence may be understood by referring to corresponding descriptions of FIG. 1 and FIG. 2.

The processor 401 is configured to: obtain the facial image collected by the camera, determine the current facial color data from the current facial image, and obtain current heart rate data of the user from the heart rate collector; determine, according to the facial image of the user, a correspondence between facial color data and heart rate data of the user from pre-stored correspondences between facial color data and heart rate data of a plurality of users, where the process is similar to a process of card reading in existing attendance checking, and a facial feature of each user is basically unique, so that when the user uses an attendance checking device provided by this application, the attendance checking device collects a facial image of the user, then, performs, according to the facial image of the user, feature comparison with pre-stored facial images of users, and when the facial image of the user is matched, can extract a correspondence between facial color data and heart rate data of the user; then, determine whether the obtained current facial color data matches the current heart rate data; and determine that recognition succeeds if the current facial color data matches the current heart rate data and determine that recognition fails if the current facial color data does not match the current heart rate data.

Figure 4:
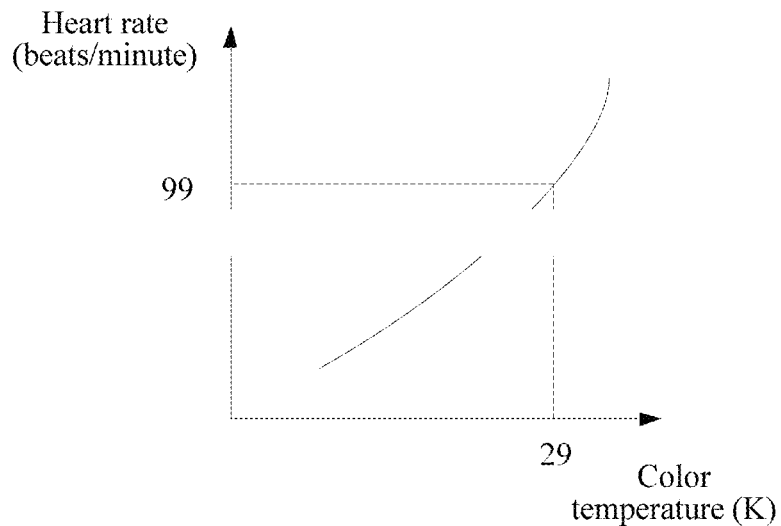
FIG. 4 is a schematic diagram of a curve of a correspondence between facial color data and heart rate data of a user in another embodiment of the present disclosure.

As shown in FIG. 4, if the processor 401 determines that a color temperature value of a current facial color is 29 K, current heart rate data obtained by the processor 401 is 98 beats/minute, and it could be determined, according to that the current facial color is 29 K, from a curve of FIG. 4 that matching heart rate data corresponding to the color temperature value is 99 beats/minute, it could be determined that a heart rate difference between the matching heart rate data and the current heart rate data is 1 beat/minute. If a preset heart rate threshold is 3 beats/minute, indicating that the heart rate difference falls within a preset heart rate threshold range, it could be determined that the current facial color data matches the current heart rate data.

If the processor 401 determines that current heart rate data is 99 beats/minute, a color temperature value of a current facial color obtained by the processor 401 is 28.5 K, and it could be determined, according to that the current heart rate data is 99 beats/minute, from the curve of FIG. 4 that a matching color temperature value corresponding to the current heart rate data is 29 K, it could be determined that a facial color difference between the matching color temperature value and the color temperature value of the current facial color is 0.5 K. If a facial color threshold is 1 K, indicating that the facial color difference falls within a preset facial color threshold range, it could be determined that the current facial color data matches the current heart rate data.

It could be learned from the foregoing description that the solution provided in this embodiment of the present disclosure effectively avoids maliciously using a photograph for facial recognition and improves recognition accuracy of a biological feature recognition apparatus.

The foregoing describes establishing a correspondence between facial color data and heart rate data of a user and an exemplary scenario of using the biological feature recognition apparatus according to this embodiment of the present disclosure in this embodiment of the present disclosure. A biological feature recognition method in this embodiment of the present disclosure is described below with reference to FIG. 5.

Figure 5:
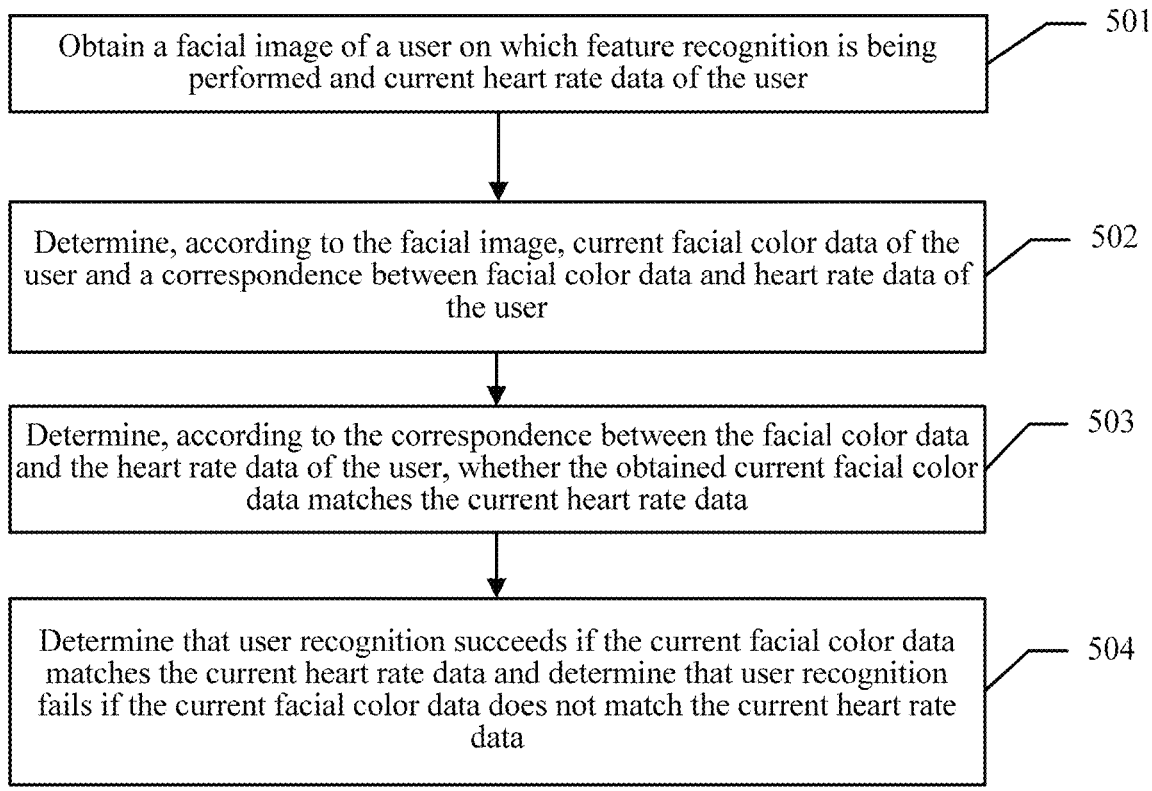
FIG. 5 is a schematic diagram of a biological feature recognition method in an embodiment of the present disclosure.

As shown in FIG. 5, an embodiment of the biological feature recognition method provided in this embodiment of the present disclosure includes:

501: Obtain a facial image of a user on which feature recognition is being performed and current heart rate data of the user.

502: Determine, according to the facial image, current facial color data of the user and a correspondence between facial color data and heart rate data of the user.

In this embodiment of the present disclosure, a facial image of a user is usually collected by a camera. The camera generally is only in responsible for collecting images. Then, current facial color data of the user can be determined by using the image collected by the camera. This process may be understood by referring to descriptions in the foregoing related parts. Details are not described herein again.

503: Determine, according to the correspondence between the facial color data and the heart rate data of the user, whether the obtained current facial color data matches the current heart rate data.

504: Determine that user recognition succeeds if the current facial color data matches the current heart rate data and determine that user recognition fails if the current facial color data does not match the current heart rate data.

Compared with the existing technology having a problem that a photograph of another person is used for recognition or a photograph is maliciously used for recognition, embodiments of the present disclosure provide a biological feature recognition method, in which recognition succeeds only when current facial color data of a user matches current heart rate data of the user, thereby effectively avoiding a loophole of biological recognition in application and improving recognition accuracy of a biological feature recognition apparatus.

Optionally, in the obtaining a facial image of a user on which feature recognition is being performed, the method may further include:
 receiving the correspondence between the facial color data and the heart rate data of the user; and
 storing the correspondence, where the correspondence is obtained by collecting in advance corresponding facial color data of the user at different heart rates.

In this embodiment of the present disclosure, the correspondence is established in advance. As described in descriptions of FIG. 1 and FIG. 2, data collection may be first performed and a correspondence may be established for a user whose correspondence between facial color data and heart rate data needs to be recorded. Subsequently, an established correspondence of each user is introduced into a biological feature recognition apparatus. In this way, in subsequent biological feature recognition processes, the correspondence can be directly used for recognition.

Optionally, the determining, according to the correspondence between the facial color data and the heart rate data of the user, whether the obtained current facial color data matches the current heart rate data includes:
 searching, according to the current facial color data, the correspondence for matching heart rate data corresponding to the current facial color data;
 determining a heart rate difference between the matching heart rate data and the current heart rate data; and
 when the heart rate difference falls within a preset heart rate threshold range, determining that the current facial color data matches the current heart rate data.

In this embodiment of the present disclosure, when current facial color data is matched with current heart rate data, matching heart rate data can be determined from a correspondence between facial color data and heart rate data of the user by using the current facial color data, and then, the matching heart rate data is compared with the current heart rate data, to determine a heart rate difference between the matching heart rate data and the current heart rate data. When the heart rate difference falls within a preset heart rate threshold range, it is determined that the current facial color data matches the current heart rate data.

Optionally, the determining, according to the correspondence between the facial color data and the heart rate data of the user, whether the obtained current facial color data matches the current heart rate data includes:
 searching, according to the current heart rate data, the correspondence for matching facial color data corresponding to the current heart rate data;
 determining a facial color difference between the matching facial color data and the current facial color data; and
 when the facial color difference falls within a preset facial color threshold range, determining that the current facial color data matches the current heart rate data.

In this embodiment of the present disclosure, when current facial color data is matched with current heart rate data, matching facial color data can be determined from a correspondence between facial color data and heart rate data of the user by using the current heart rate data, then, the matching facial color data is compared with the current facial color data, to determine a facial color difference between the matching facial color data and the current facial color data.

When the facial color difference falls within a preset facial color threshold range, it is determined that the current facial color data matches the current heart rate data.

The above are the solutions provided several embodiments of the present disclosure. During facial detection and authentication, a current facial color and a heart rate of a user are monitored simultaneously, then, it is determined whether the current facial color and the current heart rate coincide with a correspondence that is trained in advance. If the current facial color and the current heart rate coincide with the correspondence, it could be determined that the user is a normal user. Otherwise, the facial authentication is malicious.

Figure 6:
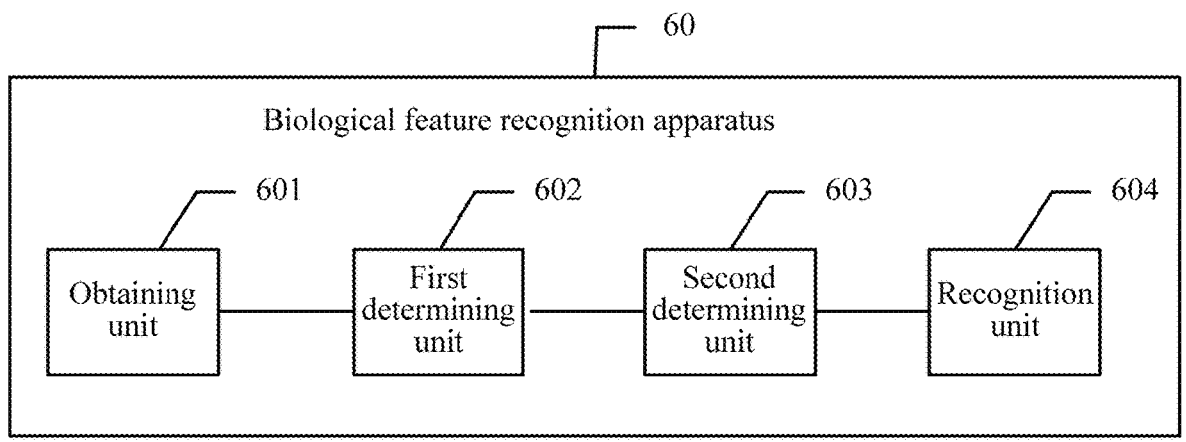
FIG. 6 is a schematic diagram of a biological feature recognition apparatus in an embodiment of the present disclosure.

As shown in FIG. 6, an embodiment of a biological feature recognition apparatus 60 provided in this embodiment of the present disclosure includes:

an obtaining unit 601, configured to obtain a facial image of a user on which feature recognition is being performed and current heart rate data of the user;

a first determining unit 602, configured to determine, according to the facial image obtained by the obtaining unit 601, current facial color data of the user and a correspondence between facial color data and heart rate data of the user;

a second determining unit 603, configured to determine, according to the correspondence between the facial color data and the heart rate data of the user determined by the first determining unit 602, whether the current facial color data obtained by the obtaining unit 601 matches the current heart rate data; and a recognition unit 604, configured to determine that user recognition succeeds if the second determining unit 603 determines that the current facial color data matches the current heart rate data and determine that user recognition fails if the current facial color data does not match the current heart rate data.

In this embodiment of the present disclosure, the obtaining unit 601 obtains a facial image of a user on which feature recognition is being performed and current heart rate data of the user; the first determining unit 602 determines, according to the facial image obtained by the obtaining unit 601, current facial color data of the user and a correspondence between facial color data and heart rate data of the user; the second determining unit 603 determines, according to the correspondence between the facial color data and the heart rate data of the user determined by the first determining unit 602, whether the current facial color data obtained by the obtaining unit 601 matches the current heart rate data; and the recognition unit 604 determines that user recognition succeeds if the second determining unit 603 determines that the current facial color data matches the current heart rate data and determines that user recognition fails if the current facial color data does not match the current heart rate data. Compared with the existing technology having a problem that a photograph of another person is used for recognition or a photograph is maliciously used for recognition, embodiments of the present disclosure provide a biological feature recognition apparatus, in which recognition succeeds only when current facial color data of a user matches current heart rate data of the user, thereby effectively avoiding a loophole of biological recognition in application and improving recognition accuracy of a biological feature recognition apparatus.

Figure 7:
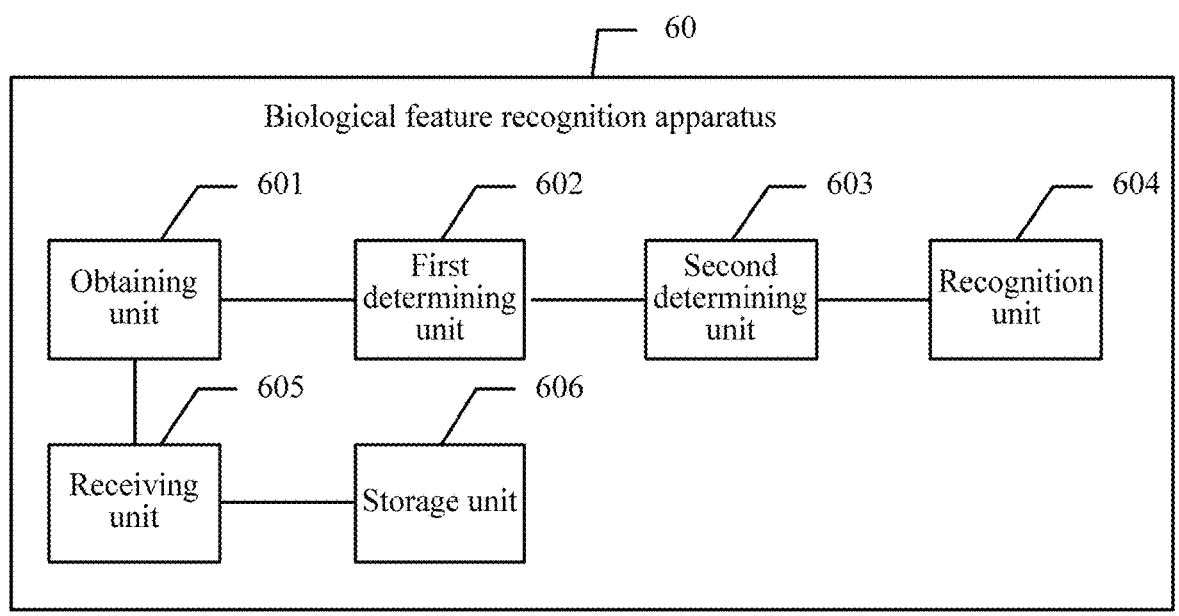
FIG. 7 is a schematic diagram of a biological feature recognition apparatus in another embodiment of the present disclosure.

Optionally, referring to FIG. 7, in another embodiment of the biological feature recognition apparatus 60 provided in this embodiment of the present disclosure, the apparatus 60 further includes a receiving unit 605 and a storage unit 606.

The receiving unit 605 is configured to receive the correspondence between the facial color data and the heart rate data of the user.

The storage unit 606 is configured to store the correspondence received by the receiving unit, where the correspondence is obtained by collecting in advance corresponding facial color data of the user at different heart rates.

Optionally, the second determining unit 603 is configured to:

searching, according to the current facial color data, the correspondence for matching heart rate data corresponding to the current facial color data;

determining a heart rate difference between the matching heart rate data and the current heart rate data; and when the heart rate difference falls within a preset heart rate threshold range, determining that the current facial color data matches the current heart rate data.

Optionally, the second determining unit 603 is configured to:

searching, according to the current heart rate data, the correspondence for matching facial color data corresponding to the current heart rate data;

determining a facial color difference between the matching facial color data and the current facial color data; and when the facial color difference falls within a preset facial color threshold range, determining that the current facial color data matches the current heart rate data.

Figure 8:
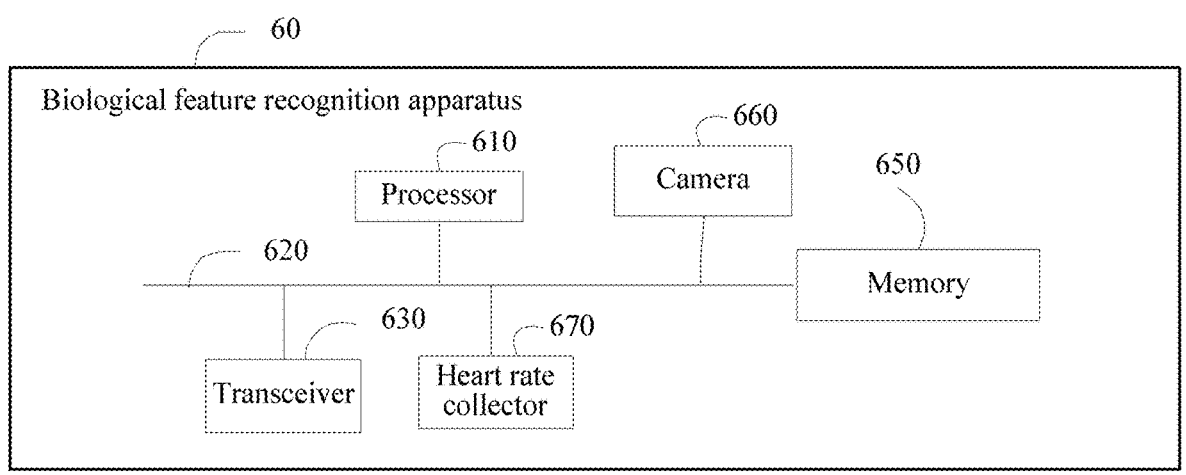
FIG. 8 is a schematic diagram of a biological feature recognition apparatus in still another embodiment of the present disclosure.

FIG. 8 is a schematic structural diagram of the biological feature recognition apparatus 60 according to an embodiment of the present disclosure. The biological feature recognition apparatus 60 includes a processor 610, a camera 660, a heart rate collector 670, a memory 650, and a transceiver 630. The camera 660 may be configured to collect a facial image of a user on which feature recognition is being performed. The heart rate collector 670 is configured to collect current heart rate data of the user. The memory 650 may include a read-only memory and a random access memory, and provides an operation instruction and data to the processor 610. A part of the memory 650 may further include a non-transitory random access memory (NVRAM).

In some implementations, the memory 650 stores the following element, executable module, or data structure, or a subset thereof, or an extension set thereof.

In this embodiment of the present disclosure, by invoking the operation instruction (the operation instruction may be stored in an operating system) stored by the memory 650, the biological feature recognition apparatus performs the following steps:

obtaining a facial image of a user on which feature recognition is being performed and current heart rate data of the user;

determining, according to the facial image, current facial color data of the user and a correspondence between facial color data and heart rate data of the user;

determining, according to the correspondence between the facial color data and the heart rate data of the user, whether the obtained current facial color data matches the current heart rate data; and determining that user recognition succeeds if the current facial color data matches the current heart rate data and determine that user recognition fails if the current facial color data does not match the current heart rate data.

Compared with the existing technology having a problem that a photograph of another person is used for recognition or a photograph is maliciously used for recognition, embodiments of the present disclosure provide a biological feature recognition apparatus, in which recognition succeeds only when current facial color data of a user matches current heart rate data of the user, thereby effectively avoiding a loophole of biological recognition in application and improving recognition accuracy of a biological feature recognition apparatus.

The processor 610 controls an operation of the biological feature recognition apparatus 60, and the processor 610 may also be referred to as a central processing unit (CPU). The memory 650 may include a read-only memory and a random access memory, and provides an instruction and data to the processor 610. A part of the memory 650 may further include a non-transitory random access memory (NVRAM). In a specific application, all components of the biological feature recognition apparatus 60 are coupled by using a bus system 620, and in addition to a data bus, the bus system 620 may further include a power source bus, a control bus, a state signal bus, and the like. However, for ease of clear description, all types of buses in the diagram are marked as the bus system 620.

The method disclosed in the foregoing embodiments of the present disclosure may be applied to the processor 610, or in other words, may be implemented by the processor 610. The processor 610 may be an integrated circuit chip and has a signal processing capability. In an implementation process, steps in the foregoing method may be implemented through a hardware integrated logical circuit in the processor 610, or an instruction in the form of software. The processor 610 may be a general-purpose processor, a digital signal processor (DSP), an application-specific integrated circuit (ASIC), a field programmable gate array (FPGA), another programmable logic component, a discrete gate or a transistor logic device, and a discrete hardware component, and may implement or execute methods, steps, and logical block diagrams disclosed in the embodiments of the present disclosure. The general-purpose processor may be a microprocessor, or the processor may alternatively be any conventional processor or the like. The steps in the method disclosed in the embodiments of the present disclosure may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 650, and the processor 610 reads information in the memory 650 and performs the steps of the foregoing method in combination with hardware of the processor.

Optionally, the transceiver 630 is configured to receive the correspondence between the facial color data and the heart rate data of the user.

The memory 650 is configured to store the correspondence, where the correspondence is obtained by collecting in advance corresponding facial color data of the user at different heart rates.

Optionally, the processor 610 is further configured to:
search, according to the current facial color data, the correspondence for matching heart rate data corresponding to the current facial color data;
determine a heart rate difference between the matching heart rate data and the current heart rate data; and
when the heart rate difference falls within a preset heart rate threshold range, determine that the current facial color data matches the current heart rate data.

Optionally, the processor 610 is further configured to:
search, according to the current heart rate data, the correspondence for matching facial color data corresponding to the current heart rate data;
determine a facial color difference between the matching facial color data and the current facial color data; and
when the facial color difference falls within a preset facial color threshold range, determine that the current facial color data matches the current heart rate data.

The foregoing biological feature recognition apparatus 60 may be understood by referring to the descriptions of FIG. 1 to FIG. 5. Details are not described herein again.

A person of ordinary skill in the art may understand that all or some of the steps of the method in the embodiments may be implemented by a program instructing relevant hardware. The program may be stored in a computer readable storage medium. The storage medium may include: a ROM, a RAM, a magnetic disk, or an optical disc.

The biological feature recognition method and apparatus provided in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person of ordinary skill in the art may make modifications to the specific implementations and application range according to the idea of the present disclosure. In conclusion, the content of this specification should not be construed as a limit on the present disclosure.

What is claimed is:

1. A biological feature recognition method performed at a biological feature recognition apparatus having one or more processors and memory storing a plurality of programs to be executed by the one or more processors, the method comprising:
obtaining, by the biological feature recognition apparatus, (i) a facial image of a user captured by a camera on which feature recognition is being performed and (ii) current heart rate data of the user detected by a heart rate collector;
determining, by the biological feature recognition apparatus according to the facial image, current facial color data of the user and a correspondence between facial color data and heart rate data of the user;
determining, by the biological feature recognition apparatus according to the correspondence between the facial color data and the heart rate data of the user, whether the obtained current facial color data matches the current heart rate data, further including:
estimating the user's heart rate from the obtained current facial color data according to the correspondence between the facial color data and the heart rate data of the user; and
comparing the estimated heart rate with the detected current heart rate data;
in accordance with a determination that the estimated heart rate matches the detected current heart rate data, determining, by the biological feature recognition apparatus, that user recognition succeeds; and
in accordance with a determination that the estimated heart rate does not match the detected current heart rate data, determining, by the biological feature recognition apparatus, that user recognition fails.

2. The method according to claim 1, wherein before the obtaining, by the biological feature recognition apparatus, a facial image of a user on which feature recognition is being performed, the method further comprises:
receiving, by the biological feature recognition apparatus, the correspondence between the facial color data and the heart rate data of the user, wherein the correspondence includes a higher-order curve determined using relational pairs of the heart rate data and the facial color data; and storing, by the biological feature recognition apparatus, the correspondence, wherein the correspondence is obtained by collecting in advance, by the biological feature recognition apparatus, corresponding facial color data of the user at different heart rates.

3. The method according to claim 1, wherein the determining, by the biological feature recognition apparatus according to the correspondence between the facial color data and the heart rate data of the user, whether the obtained current facial color data matches the current heart rate data comprises:

searching, by the biological feature recognition apparatus according to the current facial color data, the correspondence for matching heart rate data corresponding to the current facial color data;

determining, by the biological feature recognition apparatus, a heart rate difference between the matching heart rate data and the current heart rate data; and when the heart rate difference falls within a preset heart rate threshold range, determining, by the biological feature recognition apparatus, that the current facial color data matches the current heart rate data.

4. The method according to claim 1, wherein the determining, by the biological feature recognition apparatus according to the correspondence between the facial color data and the heart rate data of the user, whether the obtained current facial color data matches the current heart rate data comprises:

searching, by the biological feature recognition apparatus according to the current heart rate data, the correspondence for matching facial color data corresponding to the current heart rate data;

determining, by the biological feature recognition apparatus, a facial color difference between the matching facial color data and the current facial color data; and when the facial color difference falls within a preset facial color threshold range, determining, by the biological feature recognition apparatus, that the current facial color data matches the current heart rate data.

5. A biological feature recognition apparatus comprising one or more processors, memory, and a plurality of programs stored in the memory that, when executed by the one or more processors, cause the biological feature recognition apparatus to perform the following operations:

obtaining, by the biological feature recognition apparatus, (i) facial image of a user captured by a camera on which feature recognition is being performed and (ii) current heart rate data of the user detected by a heart rate collector;

determining, by the biological feature recognition apparatus according to the facial image, current facial color data of the user and a correspondence between facial color data and heart rate data of the user;

determining, by the biological feature recognition apparatus according to the correspondence between the facial color data and the heart rate data of the user, whether the obtained current facial color data matches the current heart rate data, further including:

estimating the user's heart rate from the obtained current facial color data according to the correspondence between the facial color data and the heart rate data of the user; and comparing the estimated heart rate with the detected current heart rate data;

in accordance with a determination that the estimated heart rate matches the detected current heart rate data, determining, by the biological feature recognition apparatus, that user recognition succeeds; and in accordance with a determination that the estimated heart rate does not match the detected current heart rate data, determining, by the biological feature recognition apparatus, that user recognition fails.

6. The biological feature recognition apparatus according to claim 5, wherein the operations further comprise:

before obtaining, by the biological feature recognition apparatus, a facial image of a user on which feature recognition is being performed:

receiving, by the biological feature recognition apparatus, the correspondence between the facial color data and the heart rate data of the user, wherein the correspondence includes a higher-order curve determined using relational pairs of the heart rate data and the facial color data; and storing, by the biological feature recognition apparatus, the correspondence, wherein the correspondence is obtained by collecting in advance, by the biological feature recognition apparatus, corresponding facial color data of the user at different heart rates.

7. The biological feature recognition apparatus according to claim 5, wherein the determining, by the biological feature recognition apparatus according to the correspondence between the facial color data and the heart rate data of the user, whether the obtained current facial color data matches the current heart rate data comprises:

searching, by the biological feature recognition apparatus according to the current facial color data, the correspondence for matching heart rate data corresponding to the current facial color data;

determining, by the biological feature recognition apparatus, a heart rate difference between the matching heart rate data and the current heart rate data; and when the heart rate difference falls within a preset heart rate threshold range, determining, by the biological feature recognition apparatus, that the current facial color data matches the current heart rate data.

8. The biological feature recognition apparatus according to claim 5, wherein the determining, by the biological feature recognition apparatus according to the correspondence between the facial color data and the heart rate data of the user, whether the obtained current facial color data matches the current heart rate data comprises:

searching, by the biological feature recognition apparatus according to the current heart rate data, the correspondence for matching facial color data corresponding to the current heart rate data;

determining, by the biological feature recognition apparatus, a facial color difference between the matching facial color data and the current facial color data; and when the facial color difference falls within a preset facial color threshold range, determining, by the biological feature recognition apparatus, that the current facial color data matches the current heart rate data.

9. A non-transitory computer readable storage medium, configured to store one or more computer programs, the computer programs comprising one or more processor executable instructions, which, when being executed by a biological feature recognition apparatus having one or more processors, cause the biological feature recognition apparatus to perform the following operations:

obtaining, by the biological feature recognition apparatus, (i) facial image of a user captured by a camera on which feature recognition is being performed and (ii) current heart rate data of the user detected by a heart rate collector;

determining, by the biological feature recognition apparatus according to the facial image, current facial color data of the user and a correspondence between facial color data and heart rate data of the user;

determining, by the biological feature recognition apparatus according to the correspondence between the facial color data and the heart rate data of the user, whether the obtained current facial color data matches the current heart rate data, further including:

estimating the user's heart rate from the obtained current facial color data according to the correspondence between the facial color data and the heart rate data of the user; and comparing the estimated heart rate with the detected current heart rate data;

in accordance with a determination that the estimated heart rate matches the detected current heart rate data, determining, by the biological feature recognition apparatus, that user recognition succeeds; and in accordance with a determination that the estimated heart rate does not match the detected current heart rate data, determining, by the biological feature recognition apparatus, that user recognition fails.

10. The non-transitory computer readable storage medium according to claim 9, wherein the operations further comprise:

before obtaining, by the biological feature recognition apparatus, a facial image of a user on which feature recognition is being performed:

receiving, by the biological feature recognition apparatus, the correspondence between the facial color data and the heart rate data of the user, wherein the correspondence includes a higher-order curve determined using relational pairs of the heart rate data and the facial color data; and storing, by the biological feature recognition apparatus, the correspondence, wherein the correspondence is obtained by collecting in advance, by the biological feature recognition apparatus, corresponding facial color data of the user at different heart rates.

11. The non-transitory computer readable storage medium according to claim 9, wherein the determining, by the biological feature recognition apparatus according to the correspondence between the facial color data and the heart rate data of the user, whether the obtained current facial color data matches the current heart rate data comprises:

searching, by the biological feature recognition apparatus according to the current facial color data, the correspondence for matching heart rate data corresponding to the current facial color data;

determining, by the biological feature recognition apparatus, a heart rate difference between the matching heart rate data and the current heart rate data; and when the heart rate difference falls within a preset heart rate threshold range, determining, by the biological feature recognition apparatus, that the current facial color data matches the current heart rate data.

12. The non-transitory computer readable storage medium according to claim 9, wherein the determining, by the biological feature recognition apparatus according to the correspondence between the facial color data and the heart rate data of the user, whether the obtained current facial color data matches the current heart rate data comprises:

searching, by the biological feature recognition apparatus according to the current heart rate data, the correspondence for matching facial color data corresponding to the current heart rate data;

determining, by the biological feature recognition apparatus, a facial color difference between the matching facial color data and the current facial color data; and when the facial color difference falls within a preset facial color threshold range, determining, by the biological feature recognition apparatus, that the current facial color data matches the current heart rate data.

* * * * *